United States Patent
Chen et al.

(10) Patent No.: US 9,441,783 B2
(45) Date of Patent: Sep. 13, 2016

(54) MOUNTING STRUCTURE FOR KEYPADS

(71) Applicant: Honeywell International Inc., Morristown, NJ (US)

(72) Inventors: Yongjun Chen, Shanghai (CN); Gen Yin, Shanghai (CN); Sihai Yu, Shanghai (CN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 280 days.

(21) Appl. No.: 14/073,010

(22) Filed: Nov. 6, 2013

(65) Prior Publication Data

US 2015/0122539 A1    May 7, 2015

(51) Int. Cl.
*H02G 3/12* (2006.01)
*F16M 13/02* (2006.01)
*H02G 3/18* (2006.01)

(52) U.S. Cl.
CPC ............ *F16M 13/02* (2013.01); *H02G 3/12* (2013.01); *H02G 3/18* (2013.01)

(58) Field of Classification Search
CPC ........ H02G 3/08; H02G 3/081; H02G 3/086; H02G 3/10; H02G 3/12; H02G 3/121; H02G 3/14; H02G 3/18; F16M 13/02; F16M 13/00; F24C 7/082
USPC .......... 174/480, 481, 50, 53, 57, 58, 67, 66, 174/559, 560, 535; 220/3.2–3.9, 4.02; 248/906
See application file for complete search history.

(56) References Cited

U.S. PATENT DOCUMENTS

| | | | | | |
|---|---|---|---|---|---|
| 4,706,359 A | * | 11/1987 | Greenhill, Sr. | ........ | H02G 3/126 248/906 |
| 4,737,599 A | * | 4/1988 | Fontaine | ............ | H01R 13/447 174/67 |
| 6,172,298 B1 | * | 1/2001 | Norvelle | ............... | H02G 3/086 174/58 |
| 8,445,780 B1 | * | 5/2013 | Robins | ..................... | H02G 3/14 174/50 |
| 8,575,497 B2 | * | 11/2013 | Hultgreen | ............... | F24C 7/082 248/906 |
| 8,777,035 B2 | * | 7/2014 | Gagne | .................... | H02G 3/121 220/3.3 |
| 8,985,364 B2 | * | 3/2015 | Gagne | .................... | H02G 3/36 220/3.3 |
| 9,083,166 B2 | * | 7/2015 | Gagne | .................... | H02G 3/086 |
| 9,166,388 B2 | * | 10/2015 | Shotey | ................... | H02G 3/081 |

* cited by examiner

*Primary Examiner* — Angel R Estrada
(74) *Attorney, Agent, or Firm* — Husch Blackwell LLP (57) ABSTRACT

An improved mounting structure for keypads is provided. The mounting structure can include first and second frame members and first and second spring-loaded members. Respective first and second ends of the first spring-loaded member can couple a first end of the first frame member to a first end of the second frame member, and respective first and second ends of the second spring-loaded member can couple a second end of the first frame member to a second end of the second frame member. Each of the first and second frame members can include at least one mounting device for mounting a second device thereto, and each of the first and second spring-loaded members can include at least one affixation mechanism for affixing the apparatus to a third device.

17 Claims, 7 Drawing Sheets

(Prior Art)

FIG. 1A

(Prior Art)

FIG. 1B

(Prior Art)

FIG. 1C

(Prior Art)

Screw in gangbox

FIG. 2C

Keypad was fixed on gangbox in wall

FIG. 2D

Spring compressed as put on keypad

Locked status (hidden front case)

FIG. 2H

MOUNTING STRUCTURE FOR KEYPADS

FIELD

The present invention relates generally to keypads. More particularly, the present invention relates to an improved mounting structure for keypads.

BACKGROUND

Currently, keypads are mounted on a mounting structure, such as a bracket, for affixing the keypad to the wall. However, known mounting structures have several disadvantages. First, known mounting structures are exposed or visible from a side view, which can be undesirable in terms of appearance and aesthetics. Furthermore, known mounting structures require the keypad to include many installation openings for mounting the keypad to the mounting structure. This can be a competitive disadvantage when vying for sales volume in the marketplace. Finally, known mounting structures, such as a bracket, increase the overall product thickness. This can be undesirable because an increased thickness causes the keypad to be increasingly displaced from a wall to which the keypad, via the mounting structure, is affixed.

Figure 1A:
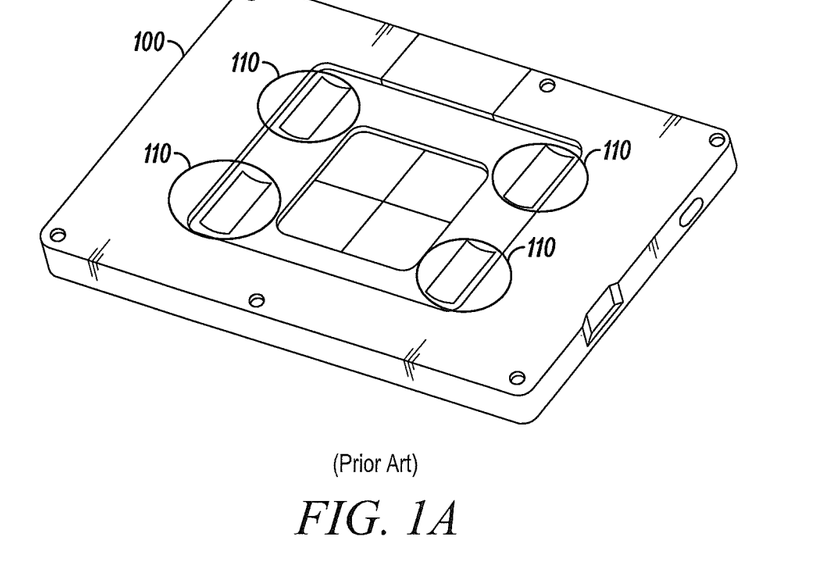
FIG. 1A is a perspective view of a back side of a keypad as known in the art.
Figure 1B:
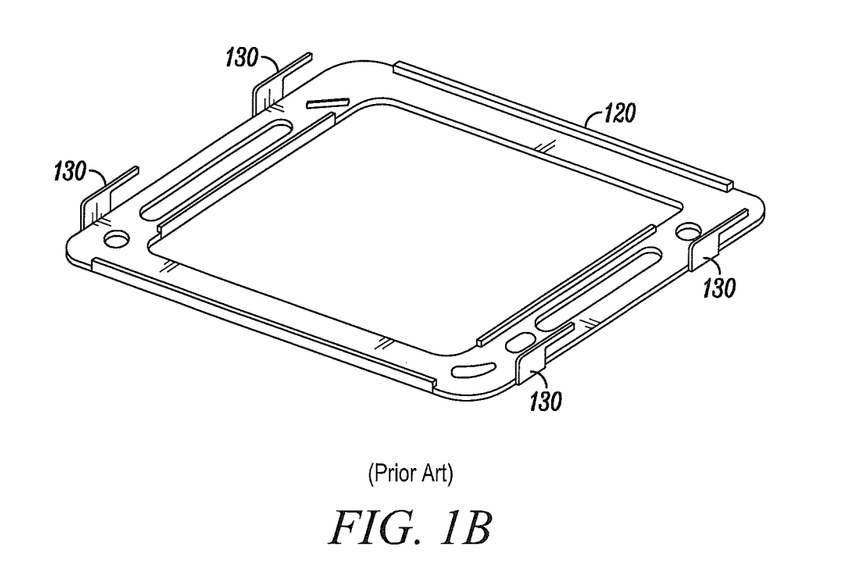
FIG. 1B is a perspective view of a mounting structure as known in the art.

FIGS. 1A-1F are views of a keypad and mounting structure known in the art. As seen in FIG. 1A, the keypad 100 includes a plurality of installation openings 110, for example, apertures or indentations, for mounting the keypad 100 to a mounting structure, for example, the bracket 120 shown in FIG. 1B. The bracket 120 includes a plurality of protrusions 130, which can be inserted into respective ones of the plurality of installation openings 110 in the keypad 100 to affix the bracket 120 to the keypad 100. The bracket 120 can be affixed to a wall as would be known by those of ordinary skill in the art.

Figure 1C:
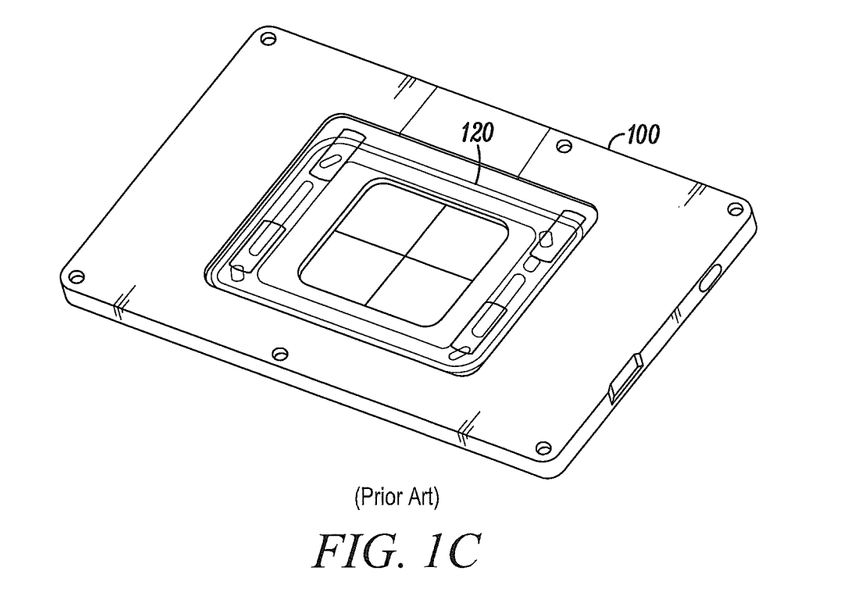
FIG. 1C is a perspective view of a mounting structure, in phantom, affixed to a keypad as known in the art.
Figure 1D:
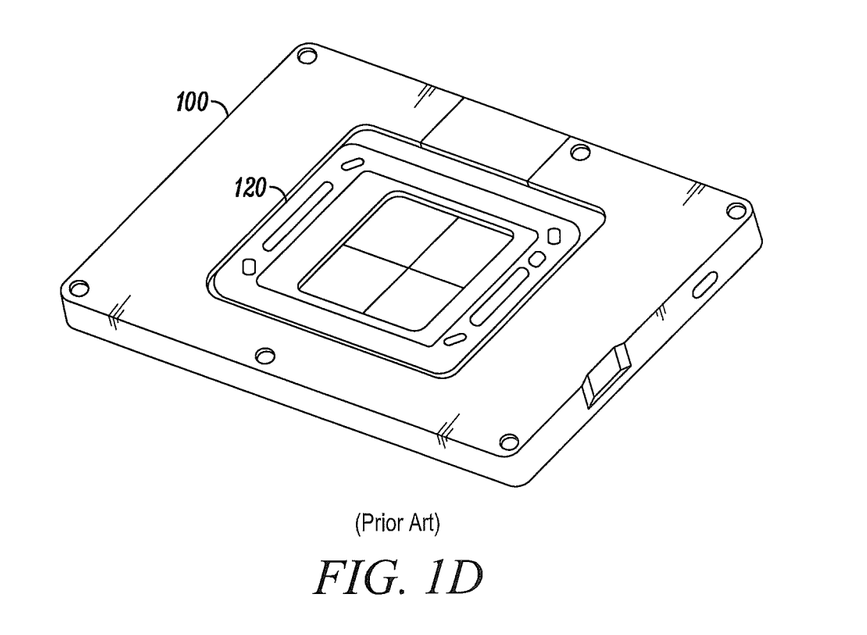
FIG. 1D is a perspective view of a mounting structure affixed to a keypad as known in the art.
Figure 1E:
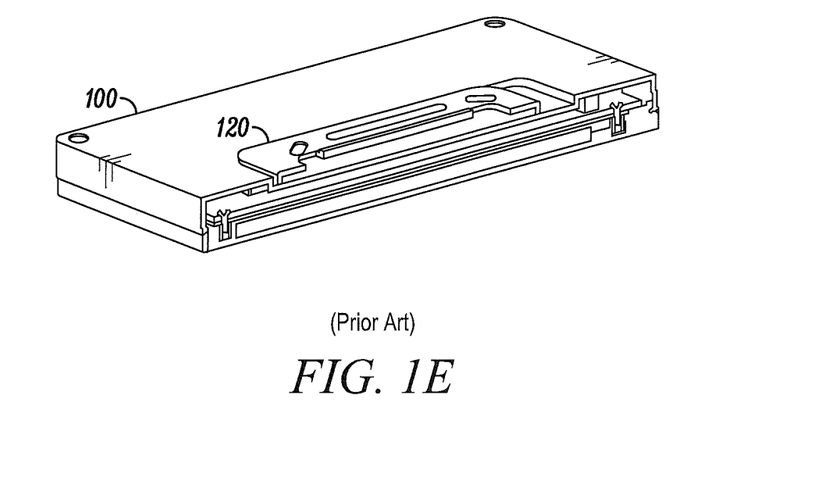
FIG. 1E is a cross-sectional view of a mounting bracket affixed to a keypad as known in the art.
Figure 1F:
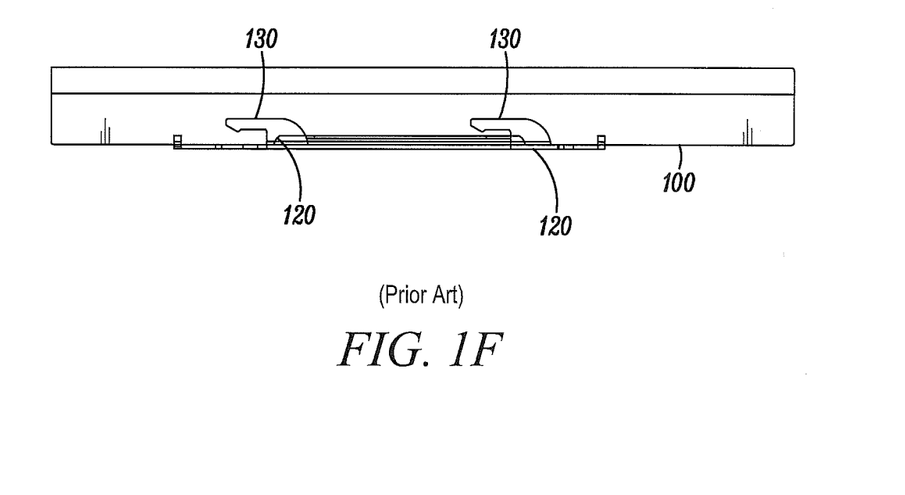
FIG. 1F is a side view of a mounting bracket affixed to a keypad as known in the art.

FIG. 1C is a phantom view and FIG. 1D is a perspective view of the bracket 120 affixed to the keypad 100. However, as seen in the cross-sectional view of FIG. 1E and the side view of FIG. 1F, even when the protrusions 130 of the bracket 120 are inserted into the openings 110 of the keypad 100 for affixing the bracket 120 to the keypad 100, a portion of the bracket 120 is exposed, visible, and adds an increased thickness to the structure. This is undesirable.

In view of the above, there is a continuing, ongoing need for an improved mounting structure for keypads.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include an improved mounting structure for keypads. For example, in some embodiments, the improved mounting structure disclosed herein can eliminate a mounting bracket that is exposed or visible from a side view. In some embodiments, the improved mounting structure disclosed herein can eliminate the need for installation openings in the keypad. Further, in some embodiments, the improved mounting structure disclosed herein can reduce and/or substantially eliminate the added product thickness caused by known mounting brackets. For example, in some embodiments, product thickness can be reduced by as much as approximately 2 mm.

Figure 2A:
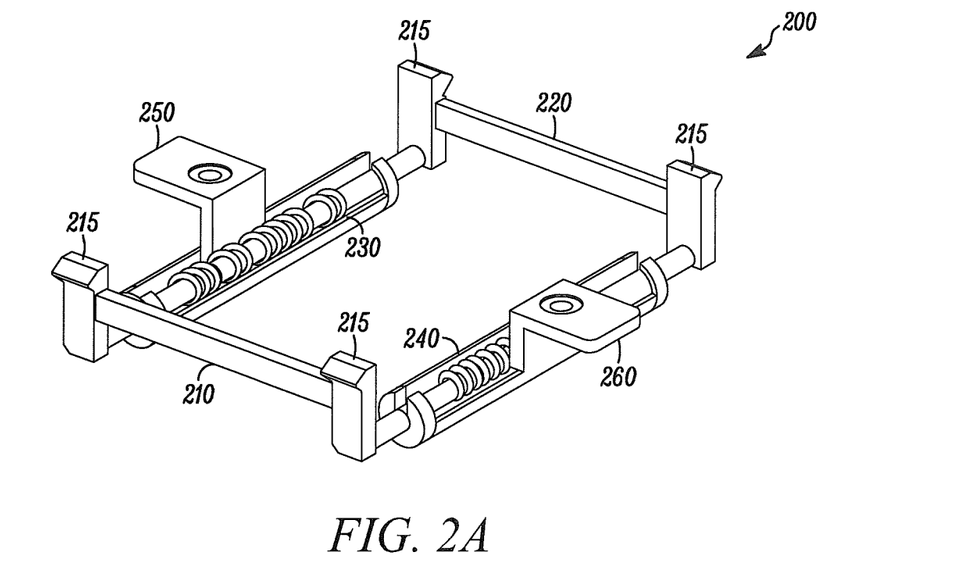
FIG. 2A is a perspective view of a mounting structure in accordance with disclosed embodiments.

FIG. 2A is a perspective view of an improved mounting structure 200 in accordance with disclosed embodiments. As seen in FIG. 2A, the mounting structure 200 can include first and second parallel frame members 210, 220 and first and second parallel spring-loaded members 230, 240. For example, in some embodiments each of the members 230, 240, can include first and second socket members 232 coupled to one another via a spring 234. In some embodiments, the socket members and the spring can be enclosed in a housing 236, for example, a housing 236 that defines a channel along which the socket members 232 and the springs 234 can slide.

Respective first and second ends of each of the first and second parallel frame members 210, 220 can be coupled to one another via respective ones of the first and second parallel spring-loaded members 230, 240, for example, respective ones of the socket members 232. Further, each of the frame members 210, 220 can include a plurality of mounting devices 215, such as, for example, a protrusion, hook, or the like, that can be used to attach, affix, or associate the mounting structure 200 to a keypad or a keypad case. In some embodiments, each of the mounting devices 215 can include an inclined hook.

Figure 2B:
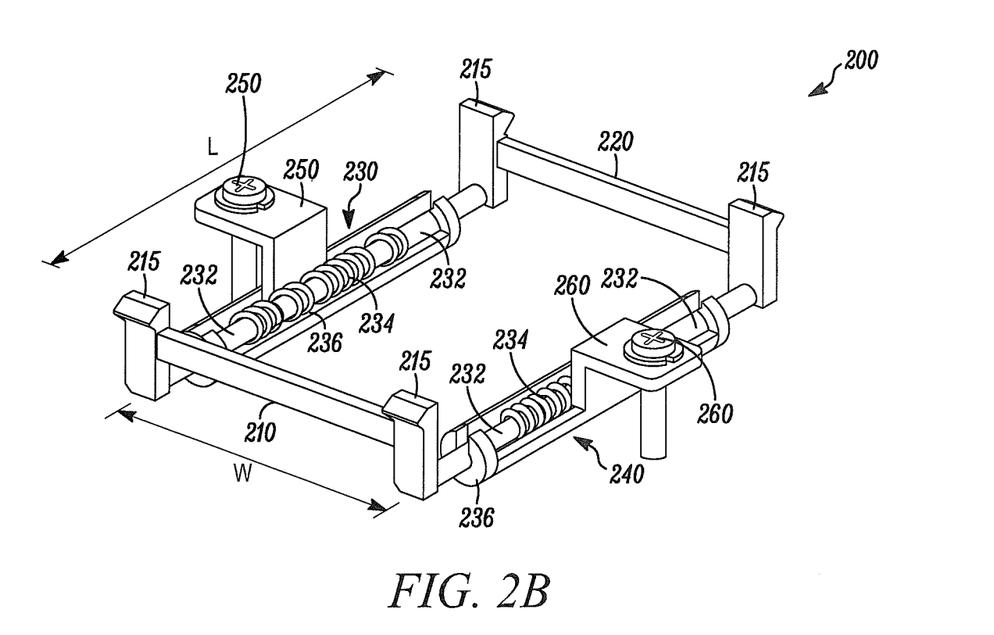
FIG. 2B is a perspective view of a mounting structure and affixation devices in accordance with disclosed embodiments.

Respective first and second affixation mechanisms 250, 260 can be attached to, associated with, and/or integral with respective ones of the members 230, 240 along the lengths thereof. For example, as seen in FIG. 2B, each of the affixation mechanisms 250, 260 can include an aperture or the like for receiving an affixation device, such as a screw, bolt, or the like, which can be used to secure the mechanism 250, 260, and thereby the mounting structure 200, to a second device or apparatus, such as a gangbox. In some embodiments, a washer can also be used in connection with the affixation mechanisms 250, 260 and the affixation device.

Figure 2C:
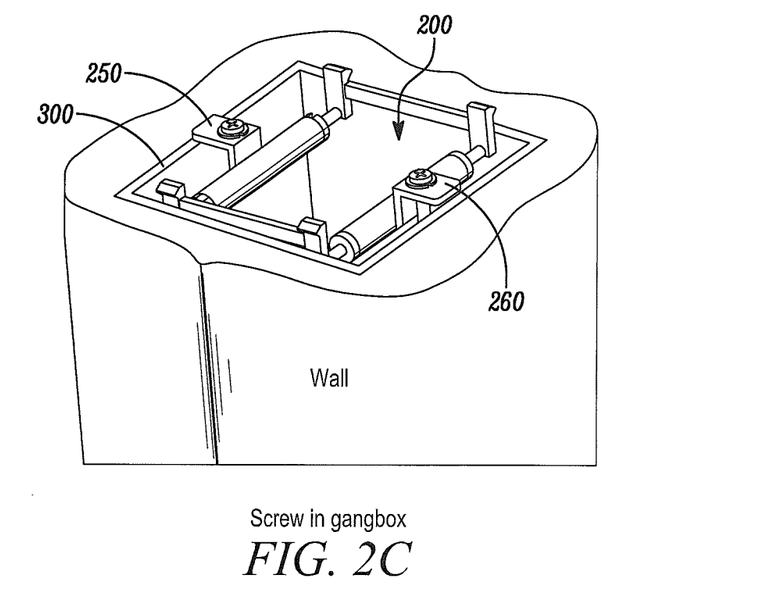
FIG. 2C is a perspective view of a mounting structure affixed to a gangbox in accordance with disclosed embodiments.
Figure 2D:
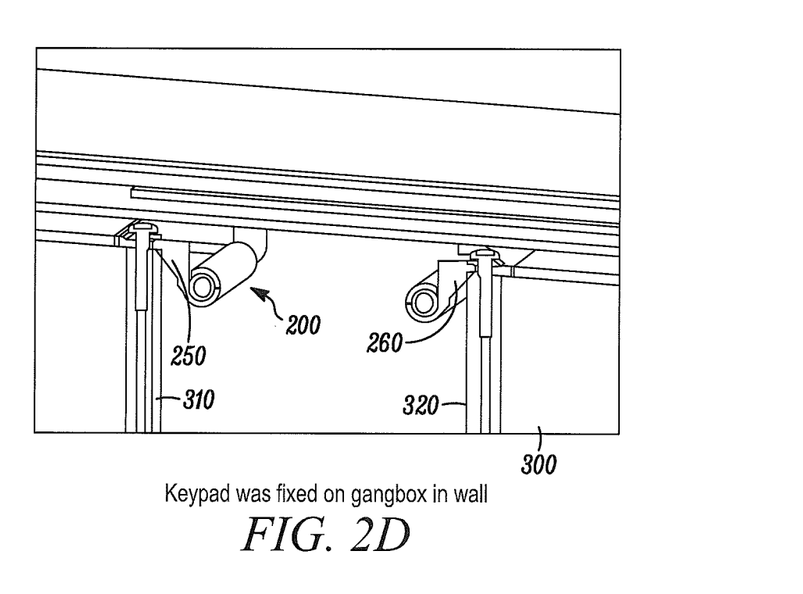
FIG. 2D is a cross-sectional view of a mounting structure affixed to a gangbox in accordance with disclosed embodiments.

As seen in FIG. 2C, a device or apparatus, such as a gangbox 300, can be disposed in a wall or other structure as would be known by those of skill in the art. The mounting structure 200 in accordance with disclosed embodiments can be affixed to, attached to, and/or associated with the gangbox 300 via the affixation mechanisms 250, 260 and respective affixation devices. For example, as best seen in the cross-sectional view of FIG. 2D, in some embodiments, the gangbox 300 can include corresponding affixation mechanisms 310, 320 for affixing to, attaching to, and/or associating with respective ones of the affixation mechanisms 250, 260 and affixation devices.

Figure 2E:
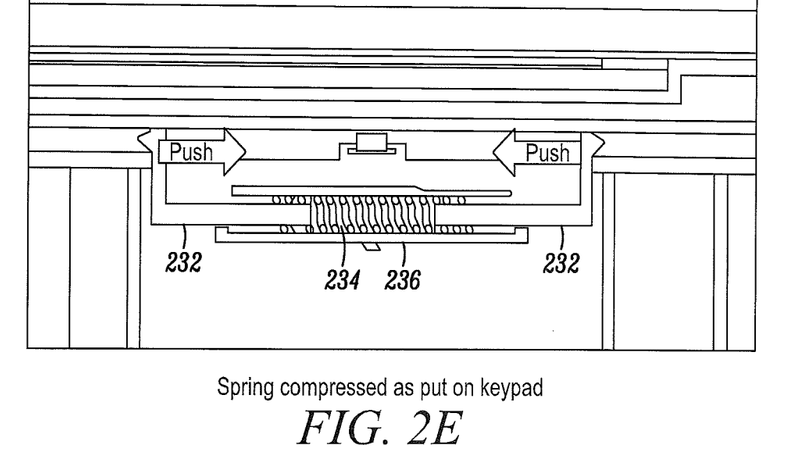
FIG. 2E is a cross-sectional view of a mounting structure affixed to a gangbox and a keypad or keypad case in accordance with disclosed embodiments.

The combination of the frame members 210, 220 and the spring-loaded members 230, 240 can form the mounting structure 200, which can include a spring frame. In some embodiments, the width W of the structure 200 can be fixed. However, in some embodiments, the length L of the structure 200 can be adjustable. For example, as best seen in the cross-sectional view of FIG. 2E, the length L of the structure 200 can be adjusted by compressing or releasing the spring 234 associated with each of the members 230, 240, thereby changing the length of each of the members 230, 240. In some embodiments, the force or pressure from the gangbox 300 or an associated keypad or keypad case, via the mounting devices 215, can cause the spring 234 associated with each of the members 230, 240 to compress.

When the mounting structure 200 is affixed to, attached to, and/or associated with the gangbox 300 as disclosed herein, the majority of the structure 200 can be disposed within the gangbox 300 so as not to protrude outside of the gangbox 300 and thereby, so as not to protrude outside of the wall. For example, in some embodiments, substantially all of the mounting structure 200 can be disposed within the gangbox 300. In some embodiments, the only portion of the mounting structure 200 that protrudes outside of the gangbox 300 can include the plurality of mounting devices 215.

Figure 2F:
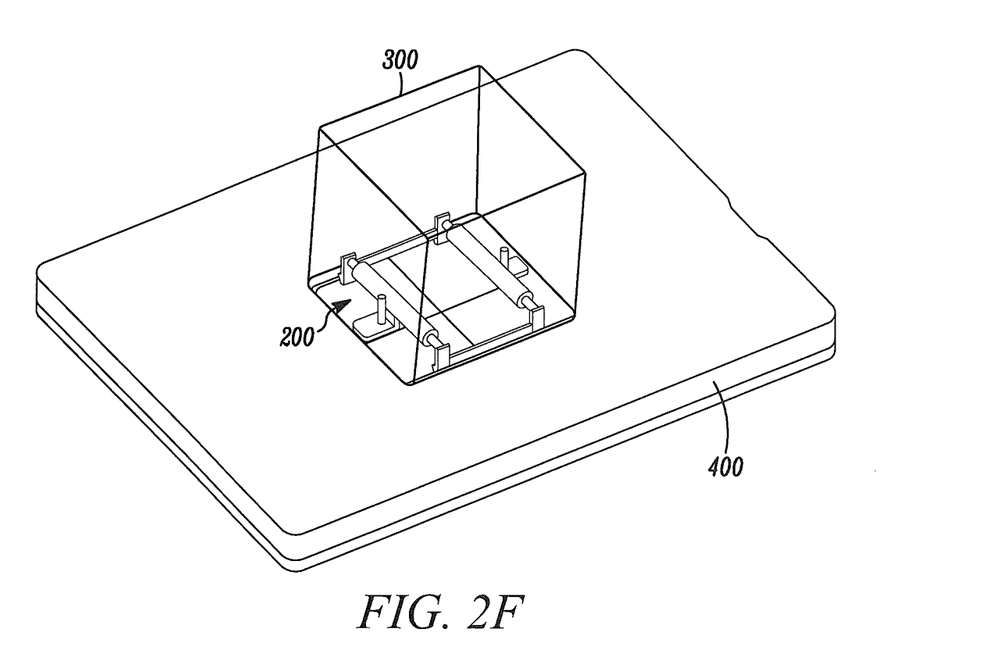
FIG. 2F is a back perspective view of a keypad affixed to a mounting structure in accordance with disclosed embodiments.
Figure 2G:
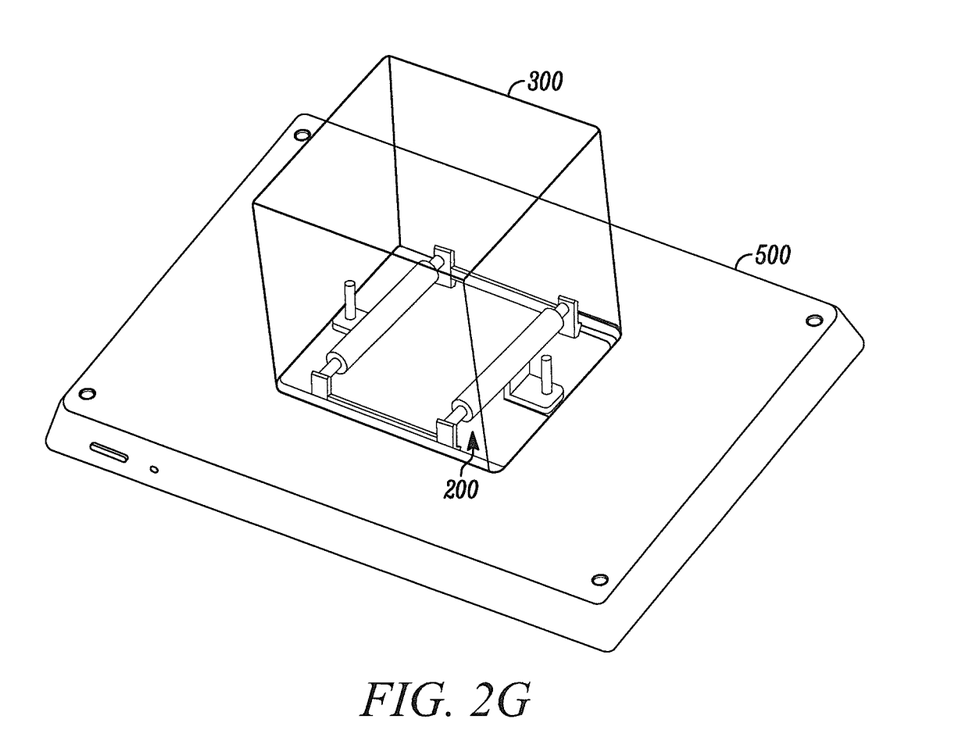
FIG. 2G is a back perspective view of a keypad case affixed to a mounting structure in accordance with disclosed embodiments.

FIG. 2F is a back perspective view of a keypad 400 affixed to a mounting structure 200 in accordance with one disclosed embodiment, and FIG. 2G is a back perspective view of a keypad case 500 affixed to a mounting structure 200 in accordance with one disclosed embodiment. The gangbox 300 is shown in phantom in both FIG. 2F and FIG. 2G. However, as seen, when the keypad 400 or the keypad case 500 is affixed to, attached to, and/or associated with the mounting structure 200 via the plurality of mounting devices 215, substantially no part of the mounting structure 200 is exposed or visible from a side view. That is, substantially all of the mounting structure 200 can be hidden from view by the gangbox 300, the wall, and/or the keypad 400 or the keypad case 500.

Figure 2H:
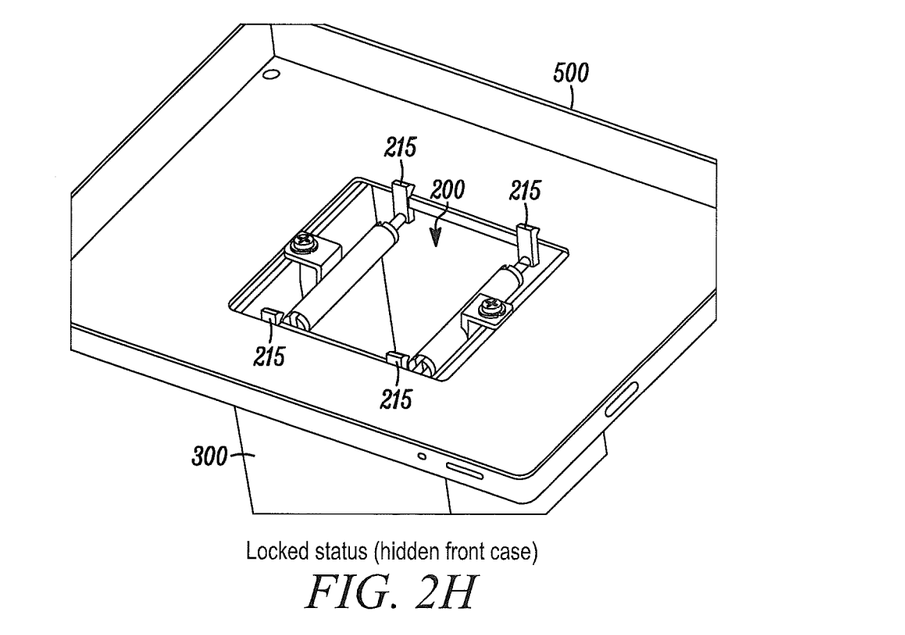
FIG. 2H is a front perspective view of a keypad case affixed to a mounting structure in accordance with disclosed embodiments.

In some embodiments, the only portion of the mounting structure 200 that extends outside of the gangbox 300 can include the mounting devices 215. For example, FIG. 2H is a front perspective view of the keypad case 500 affixed to the mounting structure 200 and illustrates the mounting devices 215 protruding outside of the gangbox 300. However, as also seen in FIG. 2H, the keypad case 500 can hide the protruding mounting devices 215 from a side view of the case 500.

In accordance with the above, in some embodiments, the mounting structure 200 does not add any thickness to the keypad 400 or keypad case 500 or cause the keypad 400 or keypad case 500 to protrude from the wall any further than the thickness of the keypad 400 itself or the keypad case 500 itself. In some embodiments, because the mounting structure 200 includes a plurality of mounting devices 215, neither the keypad 400 nor the keypad case 500 needs to include openings for affixing to, attaching to, and/or associating with the mounting devices 215 and thereby, the mounting structure 200.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the sprit and scope of the invention.

What is claimed is:

1. An apparatus comprising:
   first and second frame members; and
   first and second spring-loaded members,
   wherein respective first and second ends of the first spring-loaded member couple a first end of the first frame member to a first end of the second frame member,
   wherein respective first and second ends of the second spring-loaded member couple a second end of the first frame member to a second end of the second frame member,
   wherein each of the first and second frame members includes at least one mounting device for mounting a second device thereto, and
   wherein each of the first and second spring-loaded members includes at least one affixation mechanism for affixing the apparatus to a third device.

2. The apparatus as in claim 1 wherein, when coupled to respective ones of the first and second spring-loaded members, the first and second frame members are disposed parallel to one another.

3. The apparatus as in claim 1 wherein, when coupled to respective ones of the first and second frame members, the first and second spring-loaded members are disposed parallel to one another.

4. The apparatus as in claim 1 wherein each of the first and second spring-loaded members includes a spring.

5. The apparatus as in claim 4 wherein each of the first and second spring-loaded members includes first and second socket members, and wherein the first and second socket members are coupled to one another via the spring.

6. The apparatus as in claim 5 wherein each of the first and second spring-loaded members includes a housing defining a channel along which the first and second socket members and the spring slide.

7. The apparatus as in claim 4 wherein a length of each of the first and second spring-loaded members is adjustable by compressing and releasing the spring.

8. The apparatus as in claim 7 wherein a force from at least one of the second device and the third device compresses the spring.

9. The apparatus as in claim 1 wherein the at least one mounting device includes at least one of a protrusion, a hook, and an inclined hook.

10. The apparatus as in claim 1 wherein the second device includes at least one of a keypad and a keypad case.

11. The apparatus as in claim 1 wherein the at least one affixation mechanism includes at least one of an aperture, a screw, a bolt, and a washer.

12. The apparatus as in claim 1 wherein the third device includes a gangbox.

13. The apparatus as in claim 1 wherein the third device is disposed inside of a wall, and wherein the apparatus is affixed to the third device in a manner such that substantially all of the apparatus, except for the at least one mounting device, is disposed inside of the third device.

14. An apparatus comprising: a gangbox capable of being disposed inside of a wall; and a spring frame disposed within the gangbox and capable of affixing to the gangbox and to a second device, wherein, when affixed to the gangbox and to the second device, substantially all of the spring frame is hidden from an external view by at least one of the gangbox and the second device, wherein the spring frame comprises: first and second frame members; and first and second spring-loaded members, wherein respective first and second ends of the first spring-loaded member couple a first end of the first frame member to a first end of the second frame member, wherein respective first and second ends of the second spring-loaded member couple a second end of the first frame member to a second end of the second frame member, wherein each of the first and second frame members includes at least one mounting device for mounting the second device thereto, and wherein each of the first and second spring-loaded members includes at least one affixation mechanism for affixing the apparatus to the gangbox.

15. The apparatus as in claim 14 wherein the second device includes at least one of a keypad and a keypad case.

16. The apparatus as in claim 14 wherein at least one of the gangbox and the second device compresses a spring of the spring frame.

17. The apparatus as in claim 14 wherein the second device is removably affixed to the spring frame.

* * * * *